US011642941B2

United States Patent
Decorde et al.

(10) Patent No.: US 11,642,941 B2
(45) Date of Patent: May 9, 2023

(54) NEBULIZER SYSTEM FOR A MOTOR VEHICLE

(71) Applicant: Valeo Systemes Thermiques, Le Mesnil-Saint-Denis (FR)

(72) Inventors: Nicolas Decorde, Grasse (FR); Michel Gschwind, Grasse (FR); Frédéric Richard, Grasse (FR); Stéphane Petit, Le Mesnil Saint Denis (FR); Yves Rousseau, Le Mesnil Saint Denis (FR); Vincent Feuillard, Le Mesnil Saint Denis (FR)

(73) Assignee: Valeo Systemes Thermiques, Le Mesnil Saint-Denis (FR)

( * ) Notice: Subject to any disclaimer, the term of this patent is extended or adjusted under 35 U.S.C. 154(b) by 319 days.

(21) Appl. No.: 16/646,368

(22) PCT Filed: Jul. 27, 2018

(86) PCT No.: PCT/FR2018/051943
§ 371 (c)(1),
(2) Date: Mar. 11, 2020

(87) PCT Pub. No.: WO2019/048748
PCT Pub. Date: Mar. 14, 2019

(65) Prior Publication Data
US 2020/0269661 A1 Aug. 27, 2020

(30) Foreign Application Priority Data
Sep. 11, 2017 (FR) ...................................... 1758381

(51) Int. Cl.
*B60H 3/02* (2006.01)
*B01D 46/00* (2022.01)
*B60H 3/06* (2006.01)

(52) U.S. Cl.
CPC ......... *B60H 3/022* (2013.01); *B01D 46/0043* (2013.01); *B60H 3/0608* (2013.01)

(58) Field of Classification Search
CPC .... B60H 3/022; B60H 3/0608; B60H 3/0658; B60H 1/3457; B60H 2003/026
(Continued)

(56) References Cited

U.S. PATENT DOCUMENTS 3,469,785 A * 9/1969 Boucher et al. .... B05B 17/0615
239/4
4,257,989 A * 3/1981 Nishikawa ............... B01J 47/14
210/287

(Continued)

FOREIGN PATENT DOCUMENTS

FR  2929520 A1  10/2009
FR  2982533 B1 *  5/2014  ......... B05B 17/0615

(Continued)

OTHER PUBLICATIONS

International Search Report and Written Opinion in corresponding International Application No. PCT/FR2018/051943, dated Nov. 30, 2018 (10 pages).

(Continued)

*Primary Examiner* — Charles S Bushey
(74) *Attorney, Agent, or Firm* — Osha Bergman Watanabe & Burton LLP

(57) ABSTRACT

A nebulizer system for a motor vehicle may include a tank for a liquid, a nebulizer chamber, and a filter system capable of filtering the liquid contained in the tank for the liquid before it passes into the nebulizer chamber. The nebulizer chamber may have a nebulizer nozzle provided with an acoustic wave output device such that the liquid from the tank forms a mist of droplets of the liquid. The mist is intended to pass into a passenger compartment of the motor (Continued)

Figure 1:
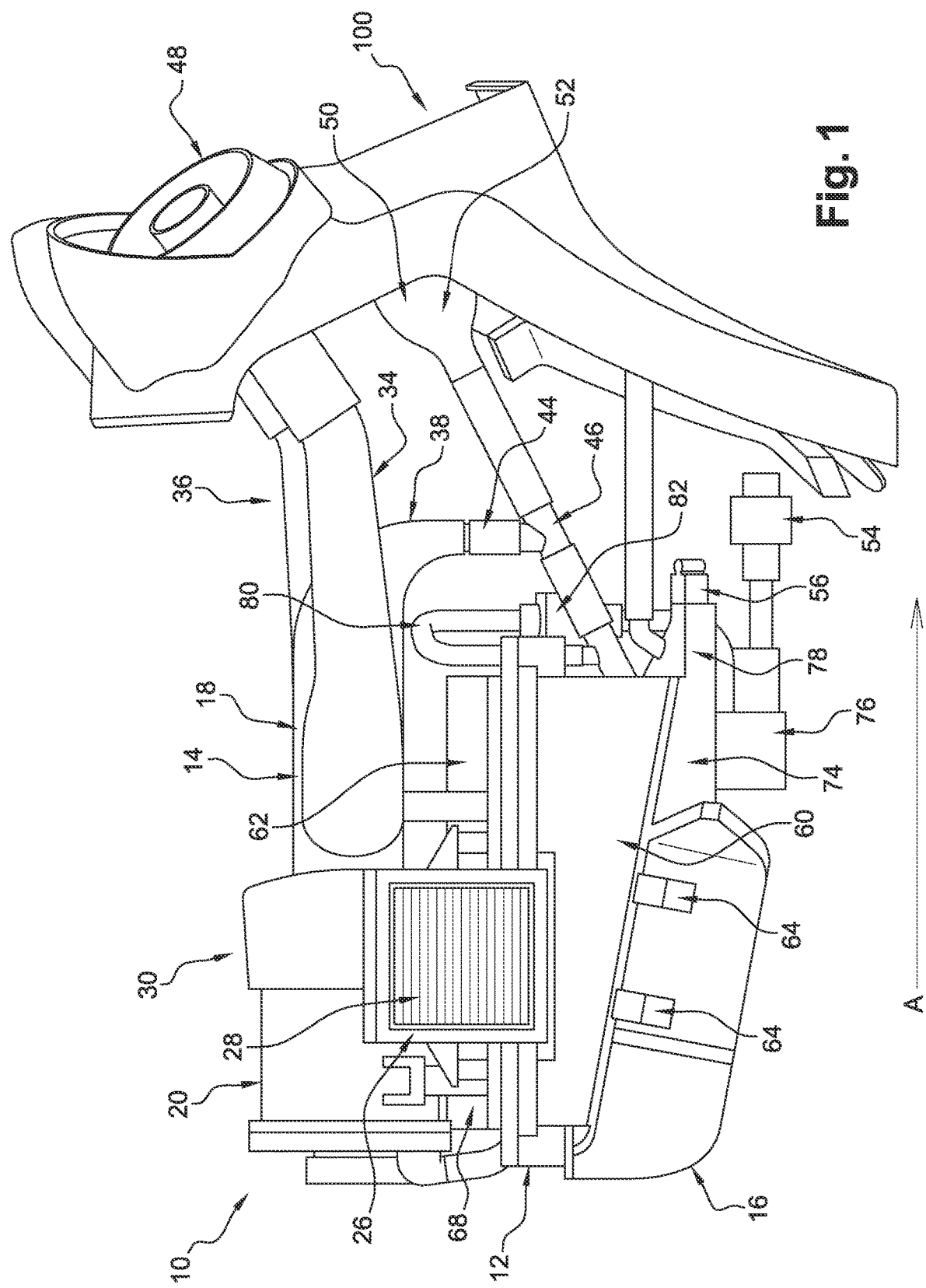

US 11,642,941 B2
Page 2 vehicle. Additionally, the nebulizer system may have an input module for air. The inlet module may have an air injection volute capable of channeling the air in the direction of the internal volume of the nebulizer chamber.

12 Claims, 3 Drawing Sheets

(58) Field of Classification Search
  USPC .......................................... 261/5, 81, DIG. 4
  See application file for complete search history.

(56) References Cited

U.S. PATENT DOCUMENTS

| | | | | |
|---|---|---|---|---|
| 4,776,990 A * | 10/1988 | Verity | .................... | B05B 12/081 261/130 |
| 4,894,154 A * | 1/1990 | Roz | ......................... | C02F 1/003 210/282 |
| 5,407,604 A * | 4/1995 | Luffman | .............. | B01F 23/2133 261/81 |
| 5,645,769 A * | 7/1997 | Tamaru | .................... | B01F 31/80 261/DIG. 4 |
| 7,654,508 B2 * | 2/2010 | Wegner | ..................... | F24F 6/14 261/78.2 |
| 9,316,405 B2 * | 4/2016 | Moon | ........................ | F24F 3/14 |
| 9,668,434 B2 * | 6/2017 | Kernahan | ............... | A01G 31/02 |
| 2003/0051886 A1 * | 3/2003 | Adiga | ........................ | B05B 7/10 169/43 |
| 2008/0283626 A1 * | 11/2008 | Aldana | ..................... | A61L 9/14 239/102.1 |
| 2016/0067368 A1 * | 3/2016 | Gschwind | ................. | F24F 6/14 239/4 |
| 2017/0203323 A1 * | 7/2017 | Gschwind | ............. | B05B 12/081 |

FOREIGN PATENT DOCUMENTS

| | | | | |
|---|---|---|---|---|
| FR | 3023735 B1 * | 7/2016 | ............. | A47F 3/001 |
| WO | 2016-009127 A1 | 1/2016 | | |
| WO | WO-2016083207 A1 * | 6/2016 | ........... | B60H 1/3421 |
| WO | 2017-103548 A1 | 6/2017 | | |

OTHER PUBLICATIONS

Office Action in corresponding Chinese Application No. 201880066350.4, dated Feb. 8, 2023 (7 pages).

* cited by examiner

NEBULIZER SYSTEM FOR A MOTOR VEHICLE

The invention concerns a nebulizer system for a motor vehicle.

More particularly, it concerns a nebulizer system comprising at least one tank for a liquid, a nebulizer enclosure, the nebulizer enclosure comprising a nebulizer nozzle provided with a device for emitting acoustic waves transmitted into the liquid and configured such that the surface of the liquid from the tank generates a mist of droplets of the liquid, the mist being intended to enter a passenger compartment of the motor vehicle, and a filter system capable of filtering the liquid contained in the tank before it passes into the nebulizer enclosure.

Such a nebulizer system can be used to cool and/or humidify an air stream in which the mist of droplets is nebulized.

In a passenger compartment of a motor vehicle, it is not unusual for users of the vehicle to suffer from the heat in the passenger compartment, in particular the rear passengers, who are positioned furthest away from the air vents connected with a ventilation, heating and/or air conditioning device of the vehicle.

As a result, it is advantageous to use a nebulizer system, because the mist of droplets quickly cools the air of the passenger compartment, providing an instant cold sensation.

However, existing systems do not allow a uniform air speed around the nebulizer nozzle, which reduces the quantity of mist sent to the passenger compartment of the motor vehicle.

The invention aims to improve the situation.

For this purpose, it proposes a nebulizer system as previously described in which the nebulizer system comprises an air inlet module, this air inlet module comprising at least one air injection blower housing capable of channeling the air towards the internal volume of the nebulizer enclosure.

Thus, as a result of the air injection blower housing, it is possible to have an air stream of uniform speed at the nebulizer enclosure.

Other specific embodiments of the invention propose that:
the air injection blower housing is suitable for being applied against an opening of the nebulizer enclosure,
the air injection blower housing is in the shape of a spiral winding around the nebulizer enclosure,
the air inlet module is secured to the nebulizer enclosure,
the air inlet module comprises at least one support for an air-moving fan,
the air inlet module comprises an air filter,
the fan and/or the air filter are arranged in a direction of extension perpendicular to a longitudinal axis of the nebulizer enclosure and on one side of the nebulizer system,
the tank for the liquid comprises a shape allowing the air inlet module to be at least partially accommodated.
the tank for the liquid is parallelepiped in shape.
the tank for the liquid is interposed at least partially between the nebulizer enclosure and the filter system.
the tank for the liquid comprises at least one face referred to as the bottom face that is inclined relative to an opposing face referred to as the top face, the angle of inclination between the inclined bottom face and the opposing top face preferably being between 10 and 20°,
the tank for the liquid comprises at least one face referred to as the bottom face that is inclined relative to an opposing face referred to as the top face, the angle of inclination between the inclined bottom face and the opposing top face preferably being between 10 and 20°,
the inclined bottom face comprises at least one means for retaining the filter system,
the inclined bottom face comprises a protrusion arranged at one end of the inclined bottom face, referred to as the bottom end, the protrusion being capable of being secured to at least one pump of the hydraulic circuit of the nebulizer system,
the protrusion comprises a first protuberance that has a main extension axis substantially parallel to a face of the tank for the liquid referred to as the side face and is capable of being secured to a drain pump of the hydraulic circuit of the nebulizer system,
the protrusion comprises a second protuberance having a main extension axis substantially parallel to an opposing top face of the tank for the liquid and being capable of being secured to a pump for moving the liquid of the hydraulic circuit of the nebulizer system,
the protrusion is further arranged, for example in a substantially central manner relative to the longitudinal extension axis of the nebulizer system, in such a way as to create two clearances to either side of the latter,
the tank for the liquid is produced in at least two parts, one of which forms a cover and comprises at least one positioning means for the nebulizer enclosure,
the tank for the liquid comprises an indentation allowing the air inlet module of the nebulizer system to be at least partially accommodated,
the filter system is arranged in an inclined manner relative to a longitudinal axis of the nebulizer enclosure and relative to the opposing top face of the tank for the liquid,
the nebulizer system comprises a priming circuit,
the nebulizer system comprises a drain circuit,
the nebulizer system comprises a filling circuit, and,
the nebulizer system comprises electronic command and control equipment such as sensors, actuators, and/or a human/machine interface.

The invention also concerns a ventilation, heating and/or air conditioning device for a motor vehicle and/or a motor vehicle comprising a nebulizer system as previously described.

Figure 2:
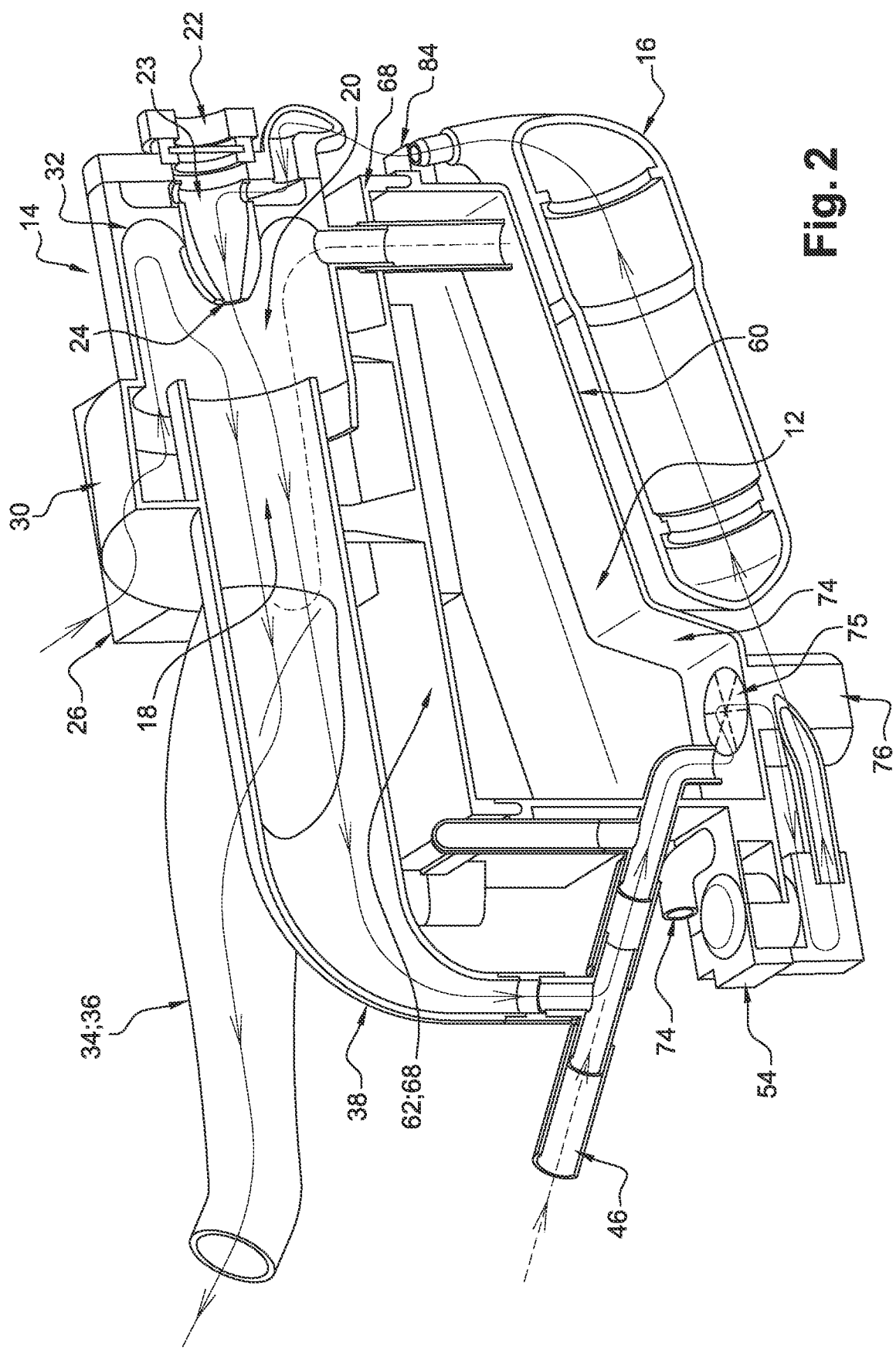
Figure 3:
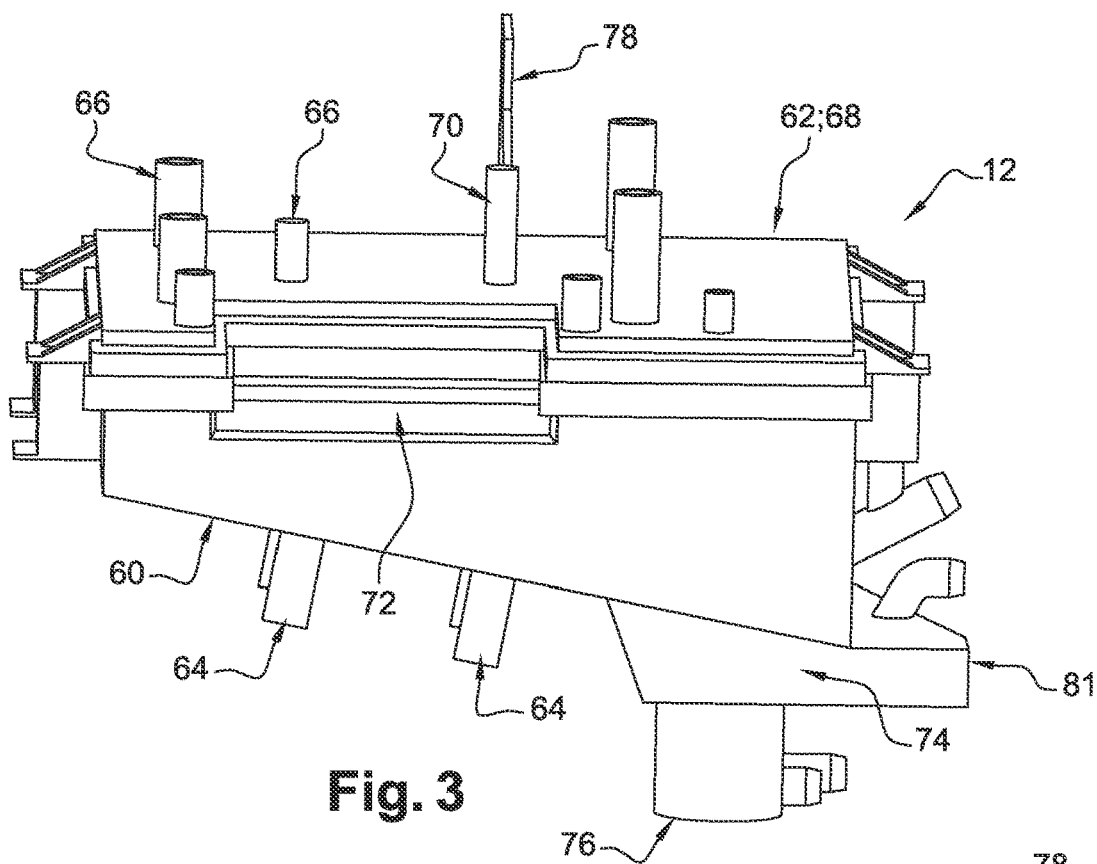
Figure 4:
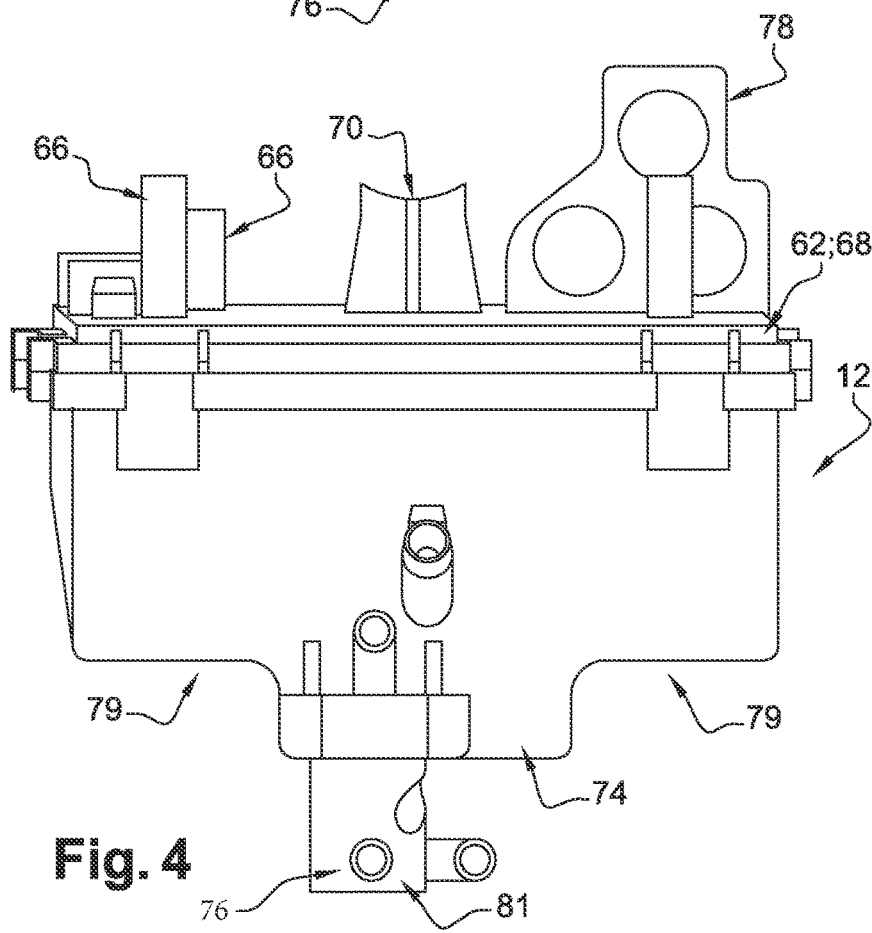

Other features and advantages of the invention will become clearer upon reading the description that follows. This is purely illustrative and should be read in view of the appended drawings in which:

FIG. 1 shows a perspective view of a nebulizer system according to an embodiment in which the nebulizer system is integrated into a central console of a motor vehicle, which is partially shown, FIG. 2 shows a partial perspective cross section view of a nebulizer system according to the invention showing, in a schematic manner, some of the aeraulic and hydraulic circuits of the nebulizer system, FIG. 3 shows a perspective view of a liquid tank of a nebulizer system according to the present invention, and, FIG. 4 shows a front view of the liquid tank of a nebulizer system of FIG. 3.

The invention concerns a nebulizer system 10 comprising at least one tank 12 for a liquid, a nebulizer enclosure 14 and a filter system 16.

The liquid contained in the tank can be water, for example.

The filter system 16 is capable of filtering the liquid contained in the tank 12 for the latter before it passes into the nebulizer enclosure 14. The filter system 16 is capable of filtering the liquid contained in the tank 12 and can, for example, form an antibacterial barrier.

In this example, the filter system 16 is arranged in fluid communication between the tank 12 for the liquid and the nebulizer enclosure 14.

The nebulizer enclosure 14 is produced, in this instance, in the form of an elongate hollow body extending along a longitudinal axis A.

In the embodiment shown in the figures, the longitudinal axis A is horizontal.

The nebulizer enclosure 14 comprises at least two parts arranged, in this instance, one after the other in the direction of the longitudinal axis A, i.e. a nebulizer chamber 20 and a nebulizer tube 18. In other words, the nebulizer chamber 20 and the nebulizer tube 18 are coaxial.

In the embodiment shown here, the nebulizer chamber 20 has a larger cross section than the nebulizer tube 18. In this example, the nebulizer tube 18 extends at least partially into the nebulizer chamber 20.

In the embodiment shown here, the nebulizer tube 18 and the nebulizer chamber 20 are cylindrical with a generally circular cross section, concentric, and both extend along the longitudinal axis, which is in this instance horizontal.

The nebulizer enclosure 14 comprises a nebulizer nozzle 22 provided with a device for emitting acoustic waves transmitted into the liquid configured such that the surface of the liquid from the tank 12 for the latter generates a mist of droplets of the liquid, this mist being intended to enter a passenger compartment of the motor vehicle.

The longitudinal axis of the nebulizer nozzle 22 is substantially parallel to the longitudinal axis A of the nebulizer enclosure 14, i.e. it is horizontal in the embodiment of the invention shown here.

The nebulizer nozzle 22 is arranged at least partially inside the nebulizer enclosure 14 and, in particular, in the nebulizer chamber 20. The nebulizer nozzle 22 can be inserted through an opening (not shown here) with, as required, insertion of a seal (also not shown here).

The nebulizer nozzle 22 comprises a lateral wall delimiting an internal volume capable of containing the liquid to be nebulized. The inner cross section of this lateral wall gradually narrows towards an outlet port for the liquid 24. The gradual narrowing makes it possible to form an acoustic wave concentrator.

A piezoelectric (ceramic) element is arranged opposite the outlet port 24 for the liquid.

The piezoelectric element is capable of emitting acoustic waves into the liquid to be sprayed, which makes it possible to generate a mist of droplets of liquid when the nebulizer nozzle 22 is filled by the latter and when the piezoelectric element emits acoustic waves of a suitable frequency and intensity. Preferably, the piezoelectric element can emit ultrasound at a frequency of between 1 MHz and 3 MHz, in particular between 1.7 MHz and 2.4 MHz.

The piezoelectric element is, for example, a quartz.

For example, the diameter of the droplets contained in the mist is less than 10 µm.

The nebulizer nozzle 22 also comprises at least one inlet port 23 for the liquid to be nebulized which allows the liquid to be nebulized to enter the internal volume of the nozzle.

In a specific example, a plurality of inlet ports 23 for the liquid, for example four, are provided around the longitudinal axis of the nebulizer nozzle 22, in a zone close to the piezoelectric element.

At least one means for detecting a lack of liquid can also be provided. The means for detecting a lack of liquid can, for example, be a level sensor.

The nebulizer system 10 further comprises an air inlet module 26, this air inlet module 26 being secured to the nebulizer enclosure 14. The air inlet module 26 can be secured by any servo control means known to a person skilled in the art.

In this example, the air inlet module 26 is attached, in particular in a removable manner, to the nebulizer chamber 20.

The air inlet module 26 comprises at least one support for an air-moving fan.

The air inlet module 26 further comprises an air filter 28 which can, for example, be arranged at the inlet of the fan, and, for example, arranged on the latter. The air filter 28 can, for example, comprise pores with a minimum dimension of 0.2 µm.

In an example not shown here, the nebulizer system 10 can comprise a deflector capable of directing the air towards the air inlet module 26 and therefore towards the nebulizer system 10.

A grating may also be provided over the air filter 28, capable of protecting this filter.

It can be seen that the fan and the air filter 28 are, in this instance, arranged in a direction of extension perpendicular to the longitudinal axis A of the nebulizer enclosure 14 and on one side of the nebulizer system 10. In this instance, the fan and the air filter 28 are arranged close to an outlet pipe for the mist 34 that is described below. Such an arrangement is advantageous in that it is compact and further helps protect the filter in the event of falling elements. Indeed, in the event of falling elements, the latter will fall onto the frame of the air filter 28 and not onto the filtering medium of the latter.

An embodiment not shown here proposes that either the fan or the air filter 28 are arranged in a direction of extension perpendicular to the longitudinal axis A of the nebulizer enclosure 14 and on one side of the nebulizer system 10.

To this end, the tank 12 for the liquid comprises an indentation or a shape allowing the air inlet module 26 and, in particular, the fan and/or the air filter 28, to be at least partially accommodated.

According to the invention, the air inlet module 26 also comprises an air injection blower housing 30 that allows the air from the fan to be channeled towards the internal volume of the nebulizer enclosure 14. In particular, the air injection blower housing 30 allows the air to be swirled around the nebulizer tube 18 while directing this air towards and around the nebulizer nozzle 22.

One embodiment proposes that the air injection blower housing 30 is semi-circular, viewed from the front.

The air injection blower housing 30 is suitable for being applied against the nebulizer enclosure 14 and, in particular, against the nebulizer chamber 20 at an opening (not shown here) referred to as the air inlet opening, with sealing means that are not shown here inserted as required.

The air injection blower housing 30 can also be in the shape of a spiral winding around the nebulizer enclosure 14, which helps achieve the effect of rotating the air in a spiral around the nebulizer enclosure 14 so as to supply it in an even more effective manner. Such a shape helps produce an air stream of uniform speed around the nebulizer nozzle 22, at least in the direction of the longitudinal axis A.

In the example shown here, the nebulizer system 10 comprises redirection means 32, which allow the direction of flow of the air from the air injection blower housing 30 to be modified towards the vicinity of the nebulizer nozzle 22. In the example shown here, such means make it possible to redirect the air around the nebulizer nozzle and parallel to the jet of liquid exiting the latter.

In other words, and as shown in FIG. 2, the air enters the nebulizer system 10 via the air inlet module 26 and, in particular, via the air filter 28, then passes through the fan. In this phase of its journey, the air circulates perpendicular to the longitudinal axis A of the nebulizer enclosure 14.

Next, the air arrives in the injection blower housing 30 before entering the nebulizer enclosure 14 at the nebulizer chamber 20. The injection blower housing 30 allows the air to be introduced into the nebulizer chamber 20 once more perpendicular to the longitudinal axis A of the nebulizer enclosure 14.

The air introduced into the nebulizer chamber 20 is then directed parallel to the longitudinal axis A of the nebulizer enclosure 14 and counter-current to the direction taken by the liquid nebulized by the nebulizer nozzle 22, until it comes up against the redirection means 32.

The redirection means 32 then direct the air in a manner substantially parallel (co-current) to the direction taken by the liquid nebulized in the nebulizer nozzle 22.

The air and the nebulized liquid mix in the nebulizer enclosure 14, in particular in the nebulizer chamber 20. Therefore, the air helps expel the mist from the nebulizer system 10.

The nebulizer system 10 further comprises at least one outlet pipe for the mist 34 or 36.

In this instance, the outlet pipe for the mist 34 or 36 is arranged at the nebulizer enclosure 14 and, in particular, in the nebulizer tube 18 part of the latter, and in its distal part of the nebulizer nozzle 22.

In the embodiments of the invention shown here, the nebulizer system 10 comprises two outlet pipes for the mist 34 and 36.

Each of the outlet pipes for the mist 34 and 36 extends here to an end port in fluid communication with at least one air vent 48 of the motor vehicle and thus the passenger compartment of this same vehicle.

In the embodiment shown here, as an example, each of the outlet pipes for the mist 34 and 36 diverges laterally from the nebulizer enclosure 14 at an angle of approximately 55° to the longitudinal axis A and to the jet of liquid exiting the nebulizer nozzle 22. The general extension axes of the two outlet pipes for the mist 34 and 36 together form an angle of approximately 110° to 130°.

At least one of the outlet pipes for the mist 34 or 36 may be provided with a flap allowing the flow of mist to be controlled.

The nebulizer tube 18 is extended after it joins the outlet pipes for the mist 34 and 36 by a tube referred to as the discharge tube for the non-nebulized liquid 38.

The discharge tube for the non-nebulized liquid 38 is intended to discharge the non-nebulized liquid, possibly mixed with a fraction of large drops. Large drops should be understood to mean drops with a diameter larger than 10 μm.

The discharge tube for the non-nebulized liquid 38 is extended in this instance by an end portion, the passage cross section of which decreases, preferably continuously, towards an end port 44.

The end port 44 is, in this instance, placed in communication with a filler pipe 46 of the nebulizer system 10.

The filler pipe 46 of the nebulizer system 10 also comprises an inlet 50 through which the nebulizer system 10 is supplied with liquid.

One embodiment proposes that a flared or funnel-shaped end-piece 52 is fitted to the filler pipe 46. The funnel shape helps better direct the liquid towards the tank 12 for the liquid. Moreover, this shape is also advantageous in that it allows different elements to be accommodated, such as a pre-filter.

In an embodiment not shown here, the end-piece 52 comprises a filter referred to as a pre-filter for the liquid to be nebulized, which allows particles of a large diameter to be eliminated from the liquid, in particular when the tank 12 for the liquid is being filled.

The pre-filter advantageously traps particles with a diameter greater than 30 μm and preferably between 50 and 200 μm, so as to trap particles such as grains of sand, for example. This pre-filter can be removed in order to be changed periodically.

The end-piece 52 and the filler pipe 46 are, in this instance, part of the filling circuit of the nebulizer system 10.

The nebulizer system 10 according to the invention can be filled with liquid (in particular water) via a hatch that can be accessed by a rear passenger of the motor vehicle equipped with the nebulizer system 10.

The nebulizer system 10 can also comprise an indicator displaying the filling level of the tank. One embodiment proposes that the latter is arranged at the central console 100 of the motor vehicle.

The nebulizer system 10 for a motor vehicle comprises, as indicated above, a tank 12 for the liquid.

The tank 12 for the liquid is shaped such that at least one wall is inclined relative to a wall situated opposite this inclined wall.

In the embodiment shown here, the tank 12 for the liquid comprises 6 faces, at least one face referred to as the bottom face 60, one face referred to as the top face 62, and four lateral faces. In other words, at least two lateral faces situated opposite each other have different dimensions and, in particular, different heights.

The bottom face (or wall) 60 is inclined relative to an opposing top face 62 and has a length and a width.

One specific embodiment proposes that the angle of inclination between the inclined bottom face 60 and the opposing top face 62 is preferably between 10 and 20°.

In this instance, the angle of inclination between the inclined bottom face 60 and the longitudinal axis A is preferably between 10 and 20°.

The inclined bottom face 60 of the tank 12 for the liquid comprises at least one retaining means 64 for the filter system 16.

In the embodiments shown here, two retaining means 64 for the filter system 16 are provided and are produced in the form of half-rings capable of gripping the filter system 16 which is, in this instance, produced in a cylindrical shape.

Thus, the inclined bottom face 60 holds the filter system 16 in an orientation that is also inclined. In other words, the filter system 16 is arranged in an inclined manner relative to the longitudinal axis A of the nebulizer enclosure 14. In yet other words, the filter system 16 is arranged in an inclined manner relative to the opposing top face 30 of the tank 12 for the liquid. Such an arrangement is advantageous in that there are no water retention points in the nebulizer system 10, which makes it easier to drain the nebulizer system 10 according to the present invention. Moreover, this arrangement means that the nebulizer system does not need to be adjusted when the motor vehicle is operating, whatever its dynamic.

According to a specific embodiment of the invention, the inclined bottom face 60 comprises a protrusion 74 arranged at one end of the inclined bottom face 60, referred to as the bottom end.

The protrusion 74 is suitable for being secured, by any servo control means known to a person skilled in the art, to at least one element of the hydraulic circuit of the nebulizer system 10, such as a pump, for example.

The protrusion 74 comprises a first protuberance 76 that has a main extension axis substantially parallel to a face of the tank for the liquid 12 referred to as the side face and is capable of being secured, by any servo control means known to a person skilled in the art, to a drain pump (or valve) 54 of the hydraulic circuit of the nebulizer system 10.

One embodiment proposes that a suction strainer 75 is provided at the interface of the protrusion 74 and the first protuberance 76. The purpose of this suction strainer is to stop possible particles circulating in the hydraulic circuit of the nebulizer system 10. The suction strainer can, for example, comprise pores with a size of between 10 and 30 μm, and preferably 20 μm.

The protrusion 74 further comprises a second protuberance 81 that has a main extension axis substantially parallel to the opposing top face 62 of the tank 12 for the liquid and is capable of being secured, by any servo control means known to a person skilled in the art, to a pump 56 for moving the liquid of the hydraulic circuit of the nebulizer system 10.

In the embodiments shown, the protrusion 74 is arranged, in this instance, for example in a substantially central manner, on the width of the inclined bottom face 60, in such a way as to create two clearances 79 to either side of this protrusion 74.

Preferably, the filter system 16 is arranged opposite and/or in the continuation of the protrusion 74.

Such an arrangement is advantageous in that two clearances 79 are thus created. The two clearances 79 each form a passage in which it is possible to arrange other elements of the motor vehicle such as, for example, air pipes.

In a specific embodiment, the tank 12 for the liquid is produced in at least two parts, one of which forms a cover 68 and comprises at least one positioning means 66 for the nebulizer enclosure 14.

In this instance, the cover 68 corresponds to the opposing top face 62 and extends in a substantially horizontal plane.

The positioning means 66 for the nebulizer enclosure 14 can be produced in the form of a cylindrical barrel comprising an opening in its central part capable of receiving a complementary means arranged opposite on the nebulizer enclosure 14.

One specific embodiment proposes that the positioning means 66 is provided with reinforcing ribs in order to support the weight of the nebulizer enclosure 14.

In another specific embodiment, the tank 12 for the liquid and, in particular, the cover 68, comprises a plate 78 provided with openings for electrical connectors to pass through.

In yet another specific embodiment, the tank 12 for the liquid and, in particular, the cover 68, comprises a support means 70 for the nebulizer enclosure 14 and, in particular, the nebulizer tube 18 part of the latter.

The tank 12 for the liquid further comprises an indentation 72 allowing the air inlet module 26 of the nebulizer system 10 to be at least partially accommodated.

The nebulizer system 10 comprises a priming circuit 80 provided with a bypass valve 82.

In one embodiment, the priming circuit 80 is positioned between the pump 56 for moving the liquid and the tank 12 for the liquid. It makes it possible, when the nebulizer system 10 is in the priming mode, to prime the pump 56 for moving the liquid before forcing the mist into the passenger compartment. Indeed, after a certain amount of time without use, the pump can lose pressure and no longer be able to function correctly. Such a characteristic has an impact on the droplets formed and therefore, ultimately, on user comfort. The priming circuit 80 helps overcome this disadvantage by restoring the operating pressure of the pump 56 for moving the liquid before injecting the droplets into the passenger compartment.

The nebulizer system 10 also comprises a transfer circuit 84 for transferring the liquid from the tank 12 for the liquid to the nebulizer nozzle 22.

The circuit for transferring the liquid is made up of a main circuit between the tank 12 for the liquid and the nebulizer nozzle 22 and a drain circuit comprising, in this instance, a draining member 54.

The draining member 54 can, for example, be a two-way valve allowing the hydraulic circuit of the nebulizer system 10 to be closed or opened.

The drain circuit allows water to be discharged from the nebulizer system 10. The draining takes place by force of gravity, for example periodically and preferably every month or periodically in the event that the liquid in the nebulizer system 10 freezes.

As described previously, the nebulizer system 10 also comprises a pump 56 for moving the liquid.

In the embodiments shown, the pump 56 for moving the liquid is fluidically connected to the tank 12 for the liquid, by means of a channel.

The tank 12 for the liquid is interposed at least partially between the nebulizer enclosure 14 and the filter system 16.

In this instance, the tank 12 for the liquid is interposed spatially between the nebulizer enclosure 14 and the filter system 16.

Such a spatial arrangement helps reduce the space requirement of the nebulizer system according to the present invention.

Moreover, the present invention allows a submerged filter system, i.e. a system below the level of the liquid of the tank, for the latter, which facilitates the priming of the nebulizer system when it is switched on.

The filter system 16 comprises at least one filter provided with a membrane provided with pores smaller than 50 μm, and preferably smaller than 20 μm.

The filter system 16 can, for example, comprise two or more filters depending on both the desired level of purification and the origin of the water.

In this instance, the filter system comprises a substantially cylindrical casing. Other embodiments propose a rectangular or square filter.

The filter system 16 is positioned upstream from the nebulizer nozzle 22 generating the mist and downstream from the pump 56 for moving the liquid, relative to the direction of flow of the liquid to be nebulized in the circuit.

The filter system 16 ensures that the nebulized liquid and, in particular, the water nebulized in the mist, is healthy for the users of the vehicle. This is especially important when the diameter of the droplets is smaller than 10 μm, in which case they reach as far as the lungs of the users of the vehicle.

The nebulizer system 10 can also comprise a water softener for reducing the hardness of the water in a known manner by reducing the quantity of calcium, thus increasing the service life of the system.

The water softener can, for example, be installed in the tank 12 for the liquid to be nebulized.

The nebulizer system 10 can comprise electronic command and control equipment such as sensors, actuators, and/or a human/machine interface.

The nebulizer system 10 can be integrated into a motor vehicle, for example into a central console as partially shown in FIG. 1. In particular, the nebulizer system 10 can be arranged in a housing situated above and/or between rear air ducts and below the front seat armrests.

The invention claimed is:

1. A nebulizer system for a motor vehicle comprising at least:
a tank for a liquid;
a nebulizer enclosure, the nebulizer enclosure comprising a nebulizer nozzle provided with a device for emitting acoustic waves configured such that the liquid from the tank forms a mist of droplets of the liquid, the mist being intended to enter a passenger compartment of the motor vehicle;
a filter system fluidly coupling the tank to the nebulizer enclosure, wherein filter system is configured to filter the liquid contained in the tank before it passes into the nebulizer enclosure, wherein the filter system is positioned downstream of the tank and upstream of the nebulizer enclosure relative to a direction of flow of the liquid;
an air inlet module, the air inlet module comprising an air injection blower housing configured to channel an air towards an internal volume of the nebulizer enclosure; and
a pump fluidically coupled to the tank to the move the liquid,
wherein the filter system is positioned upstream from the nebulizer nozzle and downstream from the pump relative to the direction of flow of the liquid.

2. The nebulizer system of claim 1, wherein the air injection blower housing is for being applied against an opening of the nebulizer enclosure.

3. The nebulizer system of claim 1, wherein the air injection blower housing is in a shape of a spiral winding around the nebulizer enclosure.

4. The nebulizer system of claim 1, wherein the air inlet module is secured to the nebulizer enclosure.

5. The nebulizer system of claim 1, wherein the air inlet module comprises at least one support for an air-moving fan.

6. The nebulizer system of claim 5, wherein the air inlet module comprises an air filter.

7. The nebulizer system of claim 6, wherein the air-moving fan and/or the air filter are arranged in a direction of extension perpendicular to a longitudinal axis of the nebulizer enclosure and on one side of the nebulizer system.

8. The nebulizer system of claim 1, wherein the tank comprises a shape allowing the air inlet module to be at least partially accommodated therein.

9. The nebulizer system as claimed in claim 1, wherein an inclined bottom face of the tank comprises at least one retaining means for the filter system.

10. The nebulizer system as claimed in claim 9, wherein the filter system is oriented against the inclined bottom face to be inclined relative to a longitudinal axis of the nebulizer enclosure.

11. The nebulizer system as claimed in claim 1, wherein filter system form an antibacterial barrier between the tank and the nebulizer enclosure.

12. The nebulizer system as claimed in claim 1, wherein the filter system comprises at least one filter with a membrane with pores smaller than 50 μm.

* * * * *